United States Patent
Hamilton, II et al.

(10) Patent No.: US 8,248,404 B2
(45) Date of Patent: Aug. 21, 2012

(54) EVENT DETERMINATION IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 12/122,887

(22) Filed: May 19, 2008

(65) Prior Publication Data
US 2009/0286605 A1    Nov. 19, 2009

(51) Int. Cl.
*G06T 15/00* (2006.01)
(52) U.S. Cl. ..................................... 345/419
(58) Field of Classification Search .................. None
See application file for complete search history.

(56) References Cited

U.S. PATENT DOCUMENTS

| | | | | |
|---|---|---|---|---|
| 5,982,372 A * | 11/1999 | Brush et al. | ................... | 345/418 |
| 2001/0019337 A1* | 9/2001 | Kim | ............................. | 345/757 |
| 2004/0034795 A1 | 2/2004 | Anderson et al. | | |
| 2006/0031578 A1 | 2/2006 | Pelletier | | |
| 2007/0038559 A1* | 2/2007 | Jung et al. | ....................... | 705/39 |
| 2007/0063999 A1* | 3/2007 | Park | ............................. | 345/419 |
| 2007/0143119 A1* | 6/2007 | Jung et al. | ........................ | 705/1 |
| 2008/0059570 A1* | 3/2008 | Bill | ............................. | 709/203 |
| 2009/0106671 A1* | 4/2009 | Olson et al. | ................... | 715/757 |
| 2009/0106776 A1* | 4/2009 | Kim et al. | ..................... | 719/318 |
| 2009/0210483 A1* | 8/2009 | Pierce et al. | ................ | 709/203 |

* cited by examiner

*Primary Examiner* — Ulka Chauhan
*Assistant Examiner* — Andrew G Yang
(74) *Attorney, Agent, or Firm* — Hoffman Warnick LLC; William Schiesser

(57) ABSTRACT

An approach that determines events in a virtual universe is described. In one embodiment, there is a method for automatically determining an occurrence of an event in a virtual universe. The method includes monitoring a plurality of regions within the virtual universe and determining an occurrence of an event within at least one of the plurality of regions according to locations of avatars that are on-line in the virtual universe and fields of view that the avatars have from each of the locations.

19 Claims, 6 Drawing Sheets

US 8,248,404 B2

EVENT DETERMINATION IN A VIRTUAL UNIVERSE

FIELD OF THE INVENTION

This invention relates generally to virtual universes, and more specifically to determining the occurrence of an event that may be of interest to avatars that are on-line in a virtual universe.

BACKGROUND OF THE INVENTION

Virtual universes or virtual worlds are computer-based simulated environments intended for its users to inhabit and interact via avatars, which are personas or representations of the users of the virtual universes and generally take the form of two-dimensional or three-dimensional human or fantastical representations of a person's self. These types of virtual universes are now most common in massive multiplayer on-line games, such as Second Life which is a trademark of Linden Research in the United States, other countries or both. Avatars in these types of virtual universes, which can number well over a million, have a wide range of business and social experiences.

As in the real world, avatars that log onto these virtual universes want to know what is happening within any of the virtual regions that form the virtual universes so that they can decide on whether it is worthwhile to attend. Typically, avatars find out about events in a virtual universe through other avatars or by just roaming through the virtual regions of the universe and finding out for themselves what type of events are occurring. If an avatar is not well connected socially to other avatars or are unfamiliar with many of the virtual regions that form a virtual universe, then it is difficult for an avatar to find out about events that are occurring in the virtual universe that may be of interest to them. This may result in the avatar having a diminished experience in the virtual universe.

SUMMARY OF THE INVENTION

In one embodiment, there is a method for automatically determining an occurrence of an event in a virtual universe. In this embodiment, the method comprises: monitoring a plurality of regions within the virtual universe; and determining an occurrence of an event within at least one of the plurality of regions according to locations of avatars that are on-line in the virtual universe and fields of view that the avatars have from each of the locations.

In a second embodiment, there is a computer system for automatically determining an occurrence of an event in a virtual universe. In this embodiment, the system comprises at least one processing unit and memory operably associated with the at least one processing unit. An event occurrence detection tool is storable in memory and executable by the at least one processing unit. The tool comprises a virtual universe monitoring component configured to monitor a plurality of regions within the virtual universe. An event determination component is configured to determine an occurrence of an event within at least one of the plurality of regions monitored by the virtual universe monitoring component, wherein the event determination component determines an occurrence of an event according to locations of avatars that are on-line in the virtual universe and fields of view that the avatars have from each of the locations.

In a third embodiment, there is a computer-readable medium storing computer instructions, which when executed, enables a computer system to automatically determine an occurrence of an event in a virtual universe. In this embodiment, the computer instructions comprises monitoring a plurality of regions within the virtual universe; and determining an occurrence of an event within at least one of the plurality of regions according to locations of avatars that are on-line in the virtual universe and fields of view that the avatars have from each of the locations.

In a fourth embodiment, there is a method for deploying an event occurrence detection tool for use in a computer system that automatically determines an occurrence of an event in a virtual universe. In this embodiment, a computer infrastructure is provided and is operable to monitor a plurality of regions within the virtual universe; and determine an occurrence of an event within at least one of the plurality of regions according to locations of avatars that are on-line in the virtual universe and fields of view that the avatars have from each of the locations.

DETAILED DESCRIPTION OF THE INVENTION

Embodiments of this invention are directed to a technique for automatically determining the occurrence of an event in a virtual universe and notifying avatars that may be on-line in the virtual universe and optionally notifying users that have avatars in the virtual universe but are off-line. An occurrence of an event is based on locations of avatars that are on-line in the virtual universe and fields of view that the avatars have from each of these locations. Event weighting is applied to locations that the avatars are presently situated as well as to the locations that are within the fields of view of the avatars from their present locations. Upon declaration of an event, an avatar can be notified of the event for example by an email, instant message, bulletin board or through an invitation to teleport to the location of the event. In one embodiment, the declaration of an event can be manually triggered by an avatar that has event declaration permissions to manually trigger an event declaration. In this embodiment, it is possible that avatars with these permissions can tag events with predetermined event identification tags so that avatars will know what type of event is occurring (e.g., a concert, art exhibit, market, etc.). In additional embodiments, tags and other data associated with the event can be stored in a database for future analysis.

Figure 1:
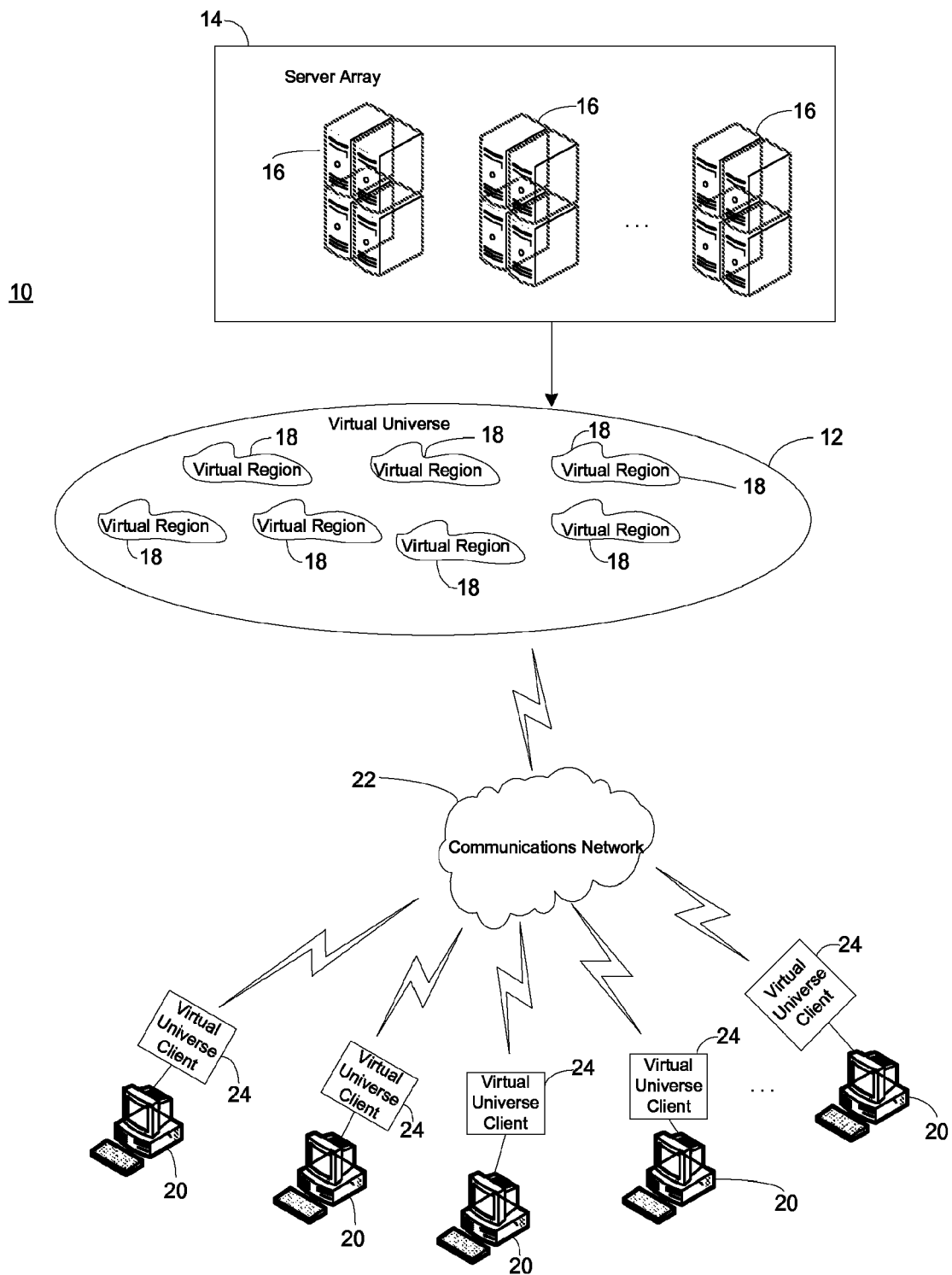
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a service for determining an occurrence of an event within the virtual universe can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20 interact with the virtual universe 12 through a communication network 22 via a virtual universe client 24 that resides in the computer. Below are further details of the virtual universe 12, server array 14, and virtual universe client 24.

Figure 2:
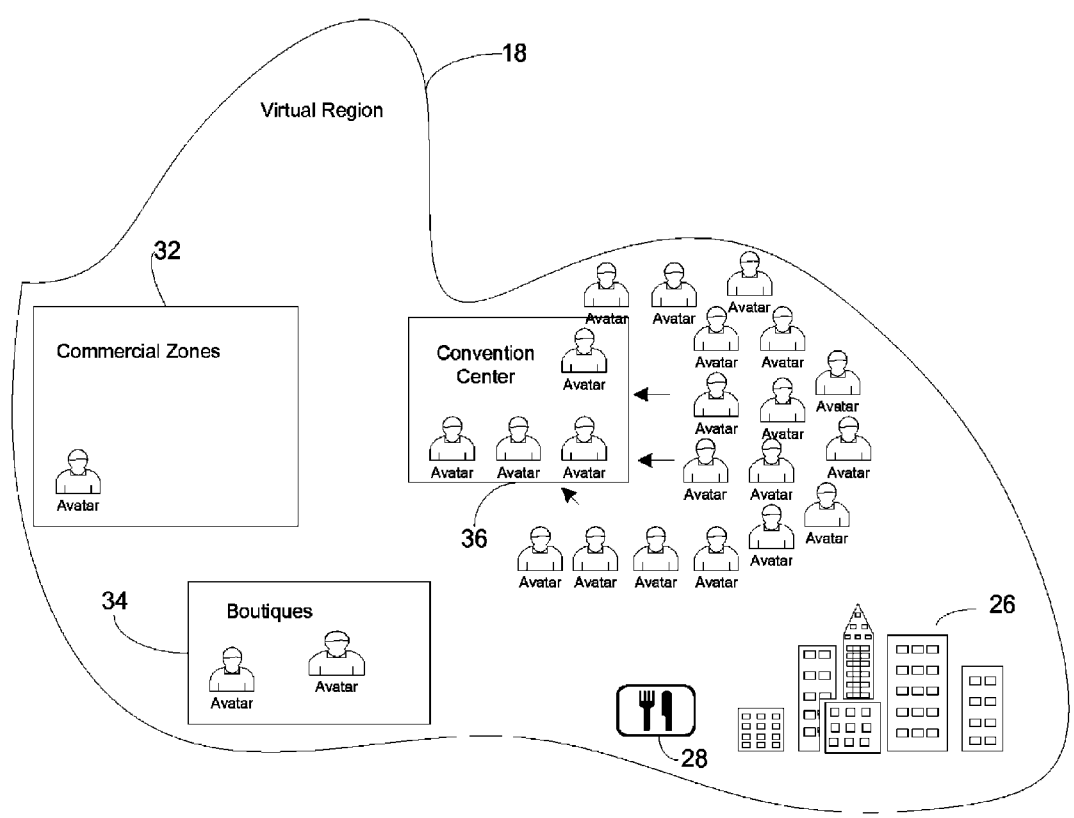
FIG. 2 shows a more detailed view of a virtual region shown in the virtual universe of FIG. 1 with avatars concentrated in various locations of the virtual region.

FIG. 2 shows a more detailed view of a virtual region shown 18 in the virtual universe 12 of FIG. 1 with avatars concentrated in various locations of the virtual region. As an example, the virtual region 18 shown in FIG. 2 comprises a downtown office center 26, restaurants 28 commercial zones 32 and boutiques 34 for shopping and a convention center 36 for meetings and various conventions. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life.

Residents or avatars which as mentioned above are personas or representations of the users of the virtual universe, roam all about the virtual region by walking, driving, flying or even by teleportation or transportation which is essentially moving through space from one point to another, more or less instantaneously. As shown in FIG. 2, there is a large concentration of avatars in or near the convention center 36, whereas there is only one avatar at the commercial zones 32, two avatars at the boutiques and none at the downtown office center 26 and restaurants 28. With so many avatars concentrated about the convention center 36, it is quite possible that an event may be occurring that is of significance that it may be worthwhile to attract other avatars that are not located near the convention center 36 or even the virtual region 18 shown in FIG. 2, or for that matter, users that are not logged onto the virtual universe 12. As used herein, an event is something that is happening or regarded as happening in space and time such as a gathering or an activity that may be of significance to avatars that are on-line or to users of a virtual universe that have avatars but are off-line. An event in a virtual world may be static or dynamic. Examples of an event in a virtual world could include a beautiful waterfall, a crime, a concert, a speech, artwork hanging from a building, an unusual avatar, etc. Below is a more detailed discussion on how the events are determined and how avatars and users are notified by such events.

Figure 3:
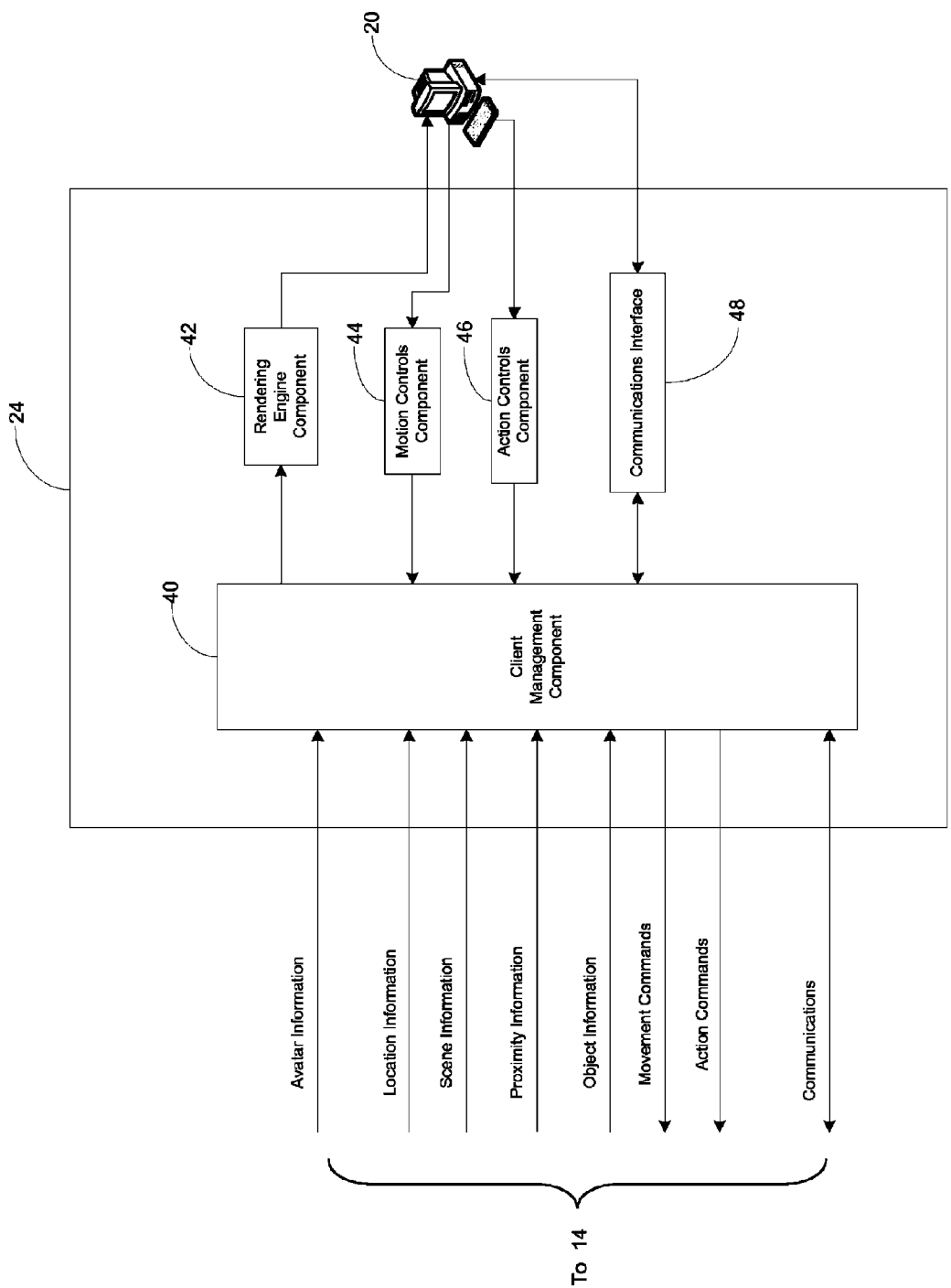
FIG. 3 shows a more detailed view of the virtual universe client shown in FIG. 1.

FIG. 3 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and email.

FIG. 3 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., postures, movements). FIG. 3 also shows the movement commands and action commands that are generated by the user that are sent to the server array via the client management component 40, as well as the communications that can be sent to the users of other avatars within the virtual universe.

Figure 4:
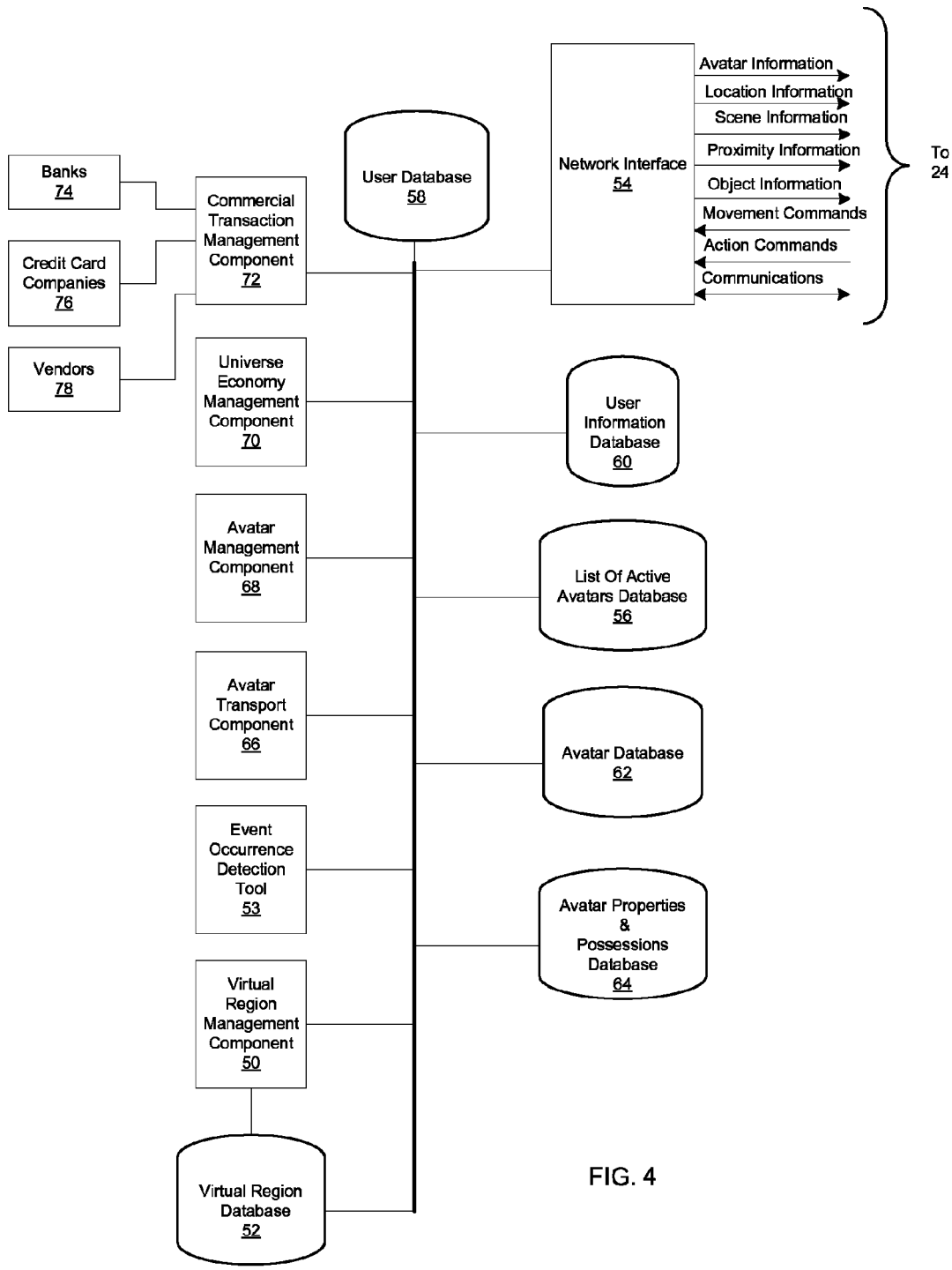
FIG. 4 shows a more detailed view of some the functionalities provided by the server array shown in FIG. 1.

FIG. 4 shows a more detailed view of some the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the amount of homes, commercial zones, boutiques, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

An event occurrence detection tool 53 automatically determines the occurrence of an event in the virtual universe 12 and notifies avatars that may be on-line in the virtual universe and even users that have avatars in the virtual universe 12 but are off-line. An occurrence of an event is based on locations of avatars that are on-line in the virtual universe and fields of view that the avatars have from each of these locations. Upon declaration of an event, the event occurrence detection tool 53 notifies avatars and users of the event through at least one of the following: an email, instant message, bulletin board or through invitation to teleport to the location of the event. Below is a more detailed discussion of the event occurrence detection tool 53 and how it monitors the virtual universe to declare an event, as well as a discussion on how the tool 53 notifies avatars and users that are off-line of the event.

FIG. 4 shows a network interface 54 that enables the server array 14 to interact with the virtual universe client 24 residing on computer 20. In particular, the network interface 54 communicates information that includes information pertaining to avatars, location, scene, proximity and objects to the user through the virtual universe client 24 and receives movement and action commands as well as communications from the user via the universe client.

As shown in FIG. 4, there are several different databases for storing information. In particular, database 56 contains a list of all the avatars that are on-line in the virtual universe 12. Databases 58 and 60 contain information on the actual human users of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the users that reside in the virtual universe 12. In one embodiment, database 62 contains information such as all of the avatars that a user may have, the profile of each avatar, avatar characteristics (e.g., appearance, voice and movement features), while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 4 as being stored in databases, those skilled in the art will recognize that other means of storing information can be utilized.

An avatar transport component 66 enables individual avatars to transport, which as mentioned above, allows avatars to transport through space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the user to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 could be used to facilitate such a transaction.

Although not expressly shown in FIG. 4, all of the components shown in the figure are configured to interact with each other. The components that are shown as being interconnected are illustrated in that manner to convey the close interactions that exist between these components such as the banks 74, credit card companies 76, and vendors with the commercial transaction management component 72.

Figure 5:
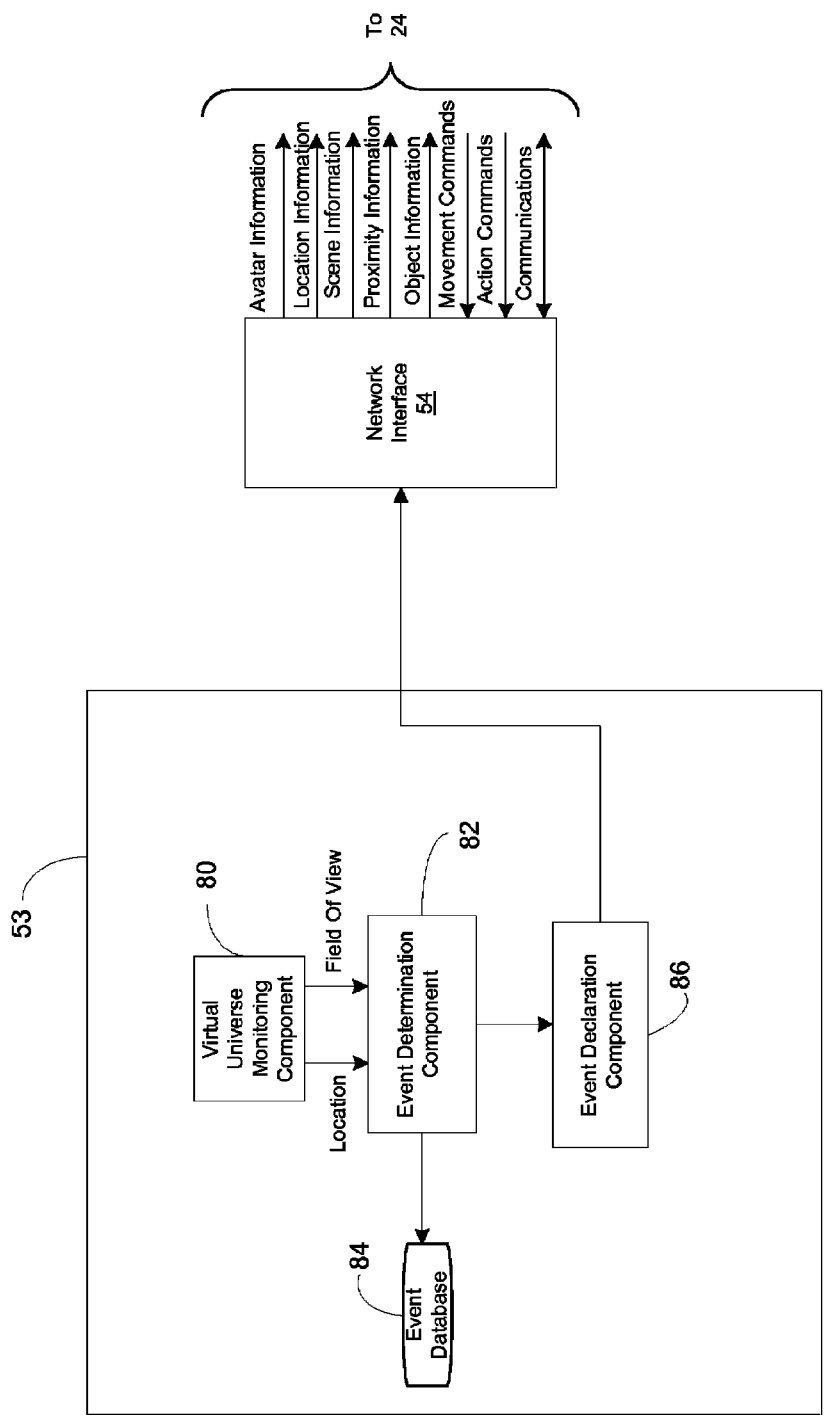
FIG. 5 shows a more detailed view of an event occurrence detection tool shown in FIG. 4 according to one embodiment of this invention.

FIG. 5 shows a more detailed view of an event occurrence detection tool 53 shown in FIG. 4 according to one embodiment of this invention. As mentioned above, the event occurrence detection tool 53 automatically determines the occurrence of an event in the virtual universe 12 and notifies avatars that may be on-line in the virtual universe and even users that have avatars in the virtual universe 12 but are off-line. As shown in FIG. 5, in one embodiment, the event occurrence detection tool 53 resides on a computer system that is apart of the server array 14 and communicates directly to the virtual universe and its residents via the virtual universe client 24. In other embodiments, the event occurrence detection tool 53 might reside on separate computers in direct communication with the virtual universe servers 16 and universe clients 24.

The event occurrence detection tool 53 comprises a virtual universe monitoring component 80 configured to monitor a plurality of regions within the virtual universe 12. The virtual universe monitoring component 80 is configured to monitor the locations of the avatars that are on-line in the virtual universe 12 and the fields of view that each of the avatars has from their locations. The virtual universe monitoring component 80 monitors the locations of the avatar by using data obtained by a virtual universe server 16 such as location information, scene information, proximity information and object information and data received from virtual universe client 24 such as avatar movement commands and avatar action commands. All of this information is typically used by virtual universe grid software that runs on the virtual universe client 24.

The virtual universe monitoring component 80 monitors the fields of view that each of the avatars has from each of their locations by using any one of well-known techniques that permit tracking of field of vision emanating from a particular point. For example, eyeball tacking and pointer placement tracking may be used to monitor the field of view that an avatar has from a particular location. In one embodiment, the virtual universe monitoring component 80 uses geometric tracing techniques to monitor the field of view that an avatar has from a location. In this embodiment, line segments or rays are directed out of the eyes of the avatar for a predetermined distance and a determination is made as to where the segments or rays intersect in the virtual grid that forms the virtual universe 12. In another embodiment, the virtual universe monitoring component 80 may determine the direction that the eyes of the avatar are facing and then ascertain from that direction what is in their field of view. Those skilled in the art will recognize that in this embodiment that the field of view can have a wide range from 0 degrees to 180 degrees and even larger fields of views for avatars that may have eyes on the sides and/or front of the their head. In still another embodiment, it is possible to have sensors placed throughout the virtual universe 12 attached to locations, objects or avatars that detect other avatars that are viewing them.

An event determination component 82 is configured to receive the location and field of view data from the virtual universe monitoring component 80 and use this data to determine an occurrence of an event within at least one of the plurality of virtual regions 18 monitored by the virtual universe monitoring component. In particular, the event determination component 82 determines an occurrence of an event according to locations of avatars that are on-line in the virtual universe 12 and their fields of view.

In one embodiment, the event determination component 82 uses an event weighting technique that applies weights to locations within the virtual universe grid that have avatars situated there as well as within the fields of view of avatars that are in relative proximity. The event weights signify the probability that an event is occurring at a particular location. The event determination component 82 can apply a weight to a location that has a significant amount of avatars at that location (e.g., 25) as opposed to a location that has only a few avatars. The event determination component 82 can also specify a weight multiplier to a particular location according to the number of avatars viewing that location. For example, if there are 35 different eyes gazing at a particular location, then that location can be weighted higher than a location that has only 12 different eyes gazing at it. Those skilled in the art will recognize that the event weighting for a location may be modified if the weighting is disproportionate to an average weighting that is historically associated with that location.

The event determination component 82 can determine whether an event is occurring by comparing the event weighting determined for a particular location to a predetermined threshold specified for the location. For example if a threshold of 20 is specified for a particular location and the event determination component 82 has determined that there is an event weighting of 35 then an event declaration will be made. A determination that is less than the threshold will not result in an event declaration.

In addition to or in place of event weighting, the event determination component 82 can use other techniques to determine the likelihood that an event is occurring at a location within the virtual universe 12. In one embodiment, the event determination component 82 can use an averaging technique to determine the occurrence of an event. For example, if a particular location usually on average has 35 avatars located in that location, then a finding of 75 avatars in that location can be used to trigger a finding of an event. With this averaging technique, a change in average threshold can be specified for each location in the virtual universe grid and used to compare with data obtained by the virtual universe monitoring component 80.

An event database 84 coupled to the event determination component 82 contains data such as event weighting data for the virtual universe grid including currently specified event weighting data and historical event weighting data. Note that certain locations that are historically known for having more events occurring at that location as opposed to locations that receive little activity will have higher historical event weights. Also, it should be noted that the current event weights will be reduced when the conditions that contributed to the weighting are removed. Although not shown in FIG. 5, the event database 84 receives information directly from other components in the virtual universe server 16 such as location information, scene information, proximity information, object information, etc.

In another embodiment, the event occurrence detection tool 53 has the capability to permit designated avatars with event declaration permissions to manually trigger an event declaration and thus override the functions performed by virtual universe monitoring component 80 and the event determination component 82. In this embodiment, the designated avatars can tag events with predetermined event identification tags so that avatars can have an idea of what type of event is happening. Examples of some identification tags can include sporting event, music, art, crime, etc. This information can be stored in the event database 84 and analyzed later. It is conceivable that such analysis could be used to solve crimes and report news.

In the embodiment where an avatar can manually trigger an event declaration, the event occurrence detection tool 53 also has the capability to weight the avatars that have this designated permission so that, for example, one avatar is given more weight then another when observing an event. This allows certain avatars to be given more weight when viewing a potentially interesting event. Consider a scenario in which the presence of such viewing avatars triggers an event notification sent to avatars who are not viewing the event, such as avatars who are geographically far away from the event or who are not logged on to the virtual universe. These remote avatars are recipients of the event notification. When these recipient avatars decide to actually view the potential event, they may be pleased with the experience of viewing the event or displeased with the viewing of the event. If pleased, they may indicate this, for example by using a graphical user interface to note this pleasure. As a result of this indication, the original viewing avatars who served to indicate the event may have a data field associated with their avatars incremented, for example, increased by one. In this manner, certain avatars may become considered as reliable or capable as indicators of useful or pleasurable events—as their data fields begin to contain higher numbers or scores. Over time, avatars with high numbers or scores may be weighted more highly when determining possible events because, based on their history, these avatars have been good determiners of useful, interesting, or pleasing events. The term "weighted" may imply that the presence of these viewing avatars is considered before other avatars or considered more strongly than other avatars.

Referring back to FIG. 5, the event occurrence detection tool 53 further comprises an event declaration component 86 configured to declare the occurrence of an event to the avatars that are on-line and even to users of the universe 12 that are off-line. For example, the event declaration component 86 is configured to provide notification to avatars through a medium that includes at least one of an email, an instant message, or a bulletin board. In addition, the event declaration component 86 can notify avatars through an invitation to teleport to the location of the event. These messages can appear in a graphic user interface (e.g., pop-up windows, chat windows, message areas) or in signs located throughout the virtual universe. Also, messages can be in the form of audio or video. In another embodiment, audio and video queues can be used to direct avatars to the location in which an event has been determined. Notification to users that have avatars in the virtual universe but are off-line can appear in the form of an email or instant message. In addition, notification can be provided via a phone call or a facsimile.

Note that in one embodiment, avatars can select notification and event threshold preferences that determine how many event notifications that they will receive. In particular, an avatar or user can specify a threshold and if the event determination component generates an event weight that is greater than the threshold, then the user will receive a notification; otherwise the notification will not occur. The preferences can be manually inputted or a slider can be used that associates with the event weights to select the sensitivity of notifications received.

In another embodiment of this invention, the event occurrence detection tool 53 is used as a service to charge fees for each notification or possibly for each event that is attended based on the notification. In this embodiment, the provider of the virtual universe or a third party service provider could offer this event occurrence detection tool as a service by performing the functionalities described herein on a subscription and/or fee basis. In this case, the provider of the virtual universe or the third party service provider can create, deploy, maintain, support, etc., the event occurrence detection tool 53 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to determine occurrences of events within a virtual universe. In this case, the event occurrence detection tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
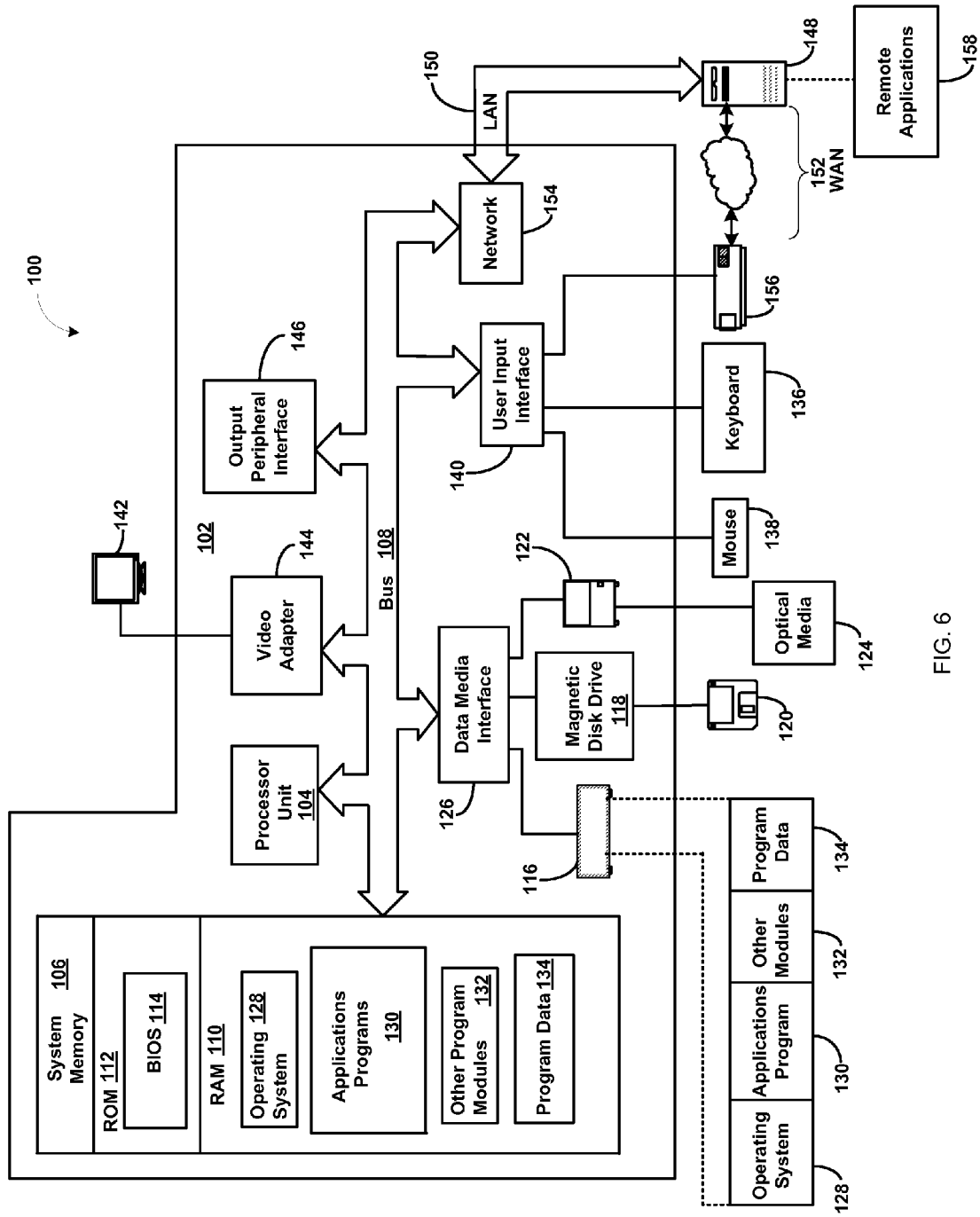
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 6.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 6, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 (e.g., the event occurrence detection tool 53 and its components), other program modules 132, and program data 134 or some combination thereof, may include an implementation of the networking environment 10 of FIG. 1 including the server array 14, the virtual universe client 24 and the event occurrence detection tool 53.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for event determination in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for automatically determining an occurrence of an event in a virtual universe, comprising:

monitoring a plurality of regions within the virtual universe; and determining an occurrence of an event within at least one of the plurality of regions according to locations of avatars that are on-line in the virtual universe and fields of view that the avatars have from each of the locations, wherein the determining of an occurrence of an event comprises applying an event weighting to the locations of the avatars that are on-line in the virtual universe and to locations of the virtual universe that are in the field of view of the avatars, wherein each event weighting applied to locations that have avatars congregated thereat and locations that are in the field of view of the avatars signifies a probability that an event is occurring at a particular location, specifying a weight multiplier to a particular location within the virtual universe as a function of a number of avatars viewing the location, wherein the weight multiplier affects the event weighting according to the number of avatars viewing the particular location, the more number of avatars viewing the location has a higher weight multiplier that corresponds to a higher event weighting specified for that location, while the less number of avatars viewing the location has a lower weight multiplier that corresponds to a lower event weighting specified for that location, and modifying the event weighting of a location in the virtual universe in response to a determination that the weighting is disproportionate to an average weighting that is historically associated with that location.

2. The method according to claim 1, further comprising declaring the occurrence of an event to the avatars.

3. The method according to claim 2, wherein the declaring of the occurrence of an event comprises notifying the avatars through a medium that includes at least one of an email message, instant message, or a bulletin board.

4. The method according to claim 2, wherein the declaring of the occurrence of an event comprises notifying the avatars through an invitation to teleport to the location of the event.

5. The method according to claim 2, wherein the declaring of the occurrence of an event to the avatars within the virtual universe is based on specified notification and event threshold preferences.

6. The method according to claim 2, wherein the declaring of the occurrence of an event comprises notifying users that have avatars in the virtual universe but are presently off-line during declaration of the event.

7. The method according to claim 1, wherein the determining of an occurrence of an event comprises permitting designated avatars with event declaration permissions to manually trigger an event declaration.

8. The method according to claim 7, further comprising enabling the designated avatars to tag events with predetermined event identification tags.

9. The method according to claim 7, further comprising applying a weight to the designated avatars that is indicative as having more importance with respect to observing an event that is potentially interesting to other avatars without event declaration permissions.

10. A computer system for automatically determining an occurrence of an event in a virtual universe, comprising:

at least one processing unit;

memory operably associated with the at least one processing unit; and an event occurrence detection tool storable in memory and executable by the at least one processing unit, the tool comprising:

a virtual universe monitoring component configured to monitor a plurality of regions within the virtual universe; and an event determination component configured to determine an occurrence of an event within at least one of the plurality of regions monitored by the virtual universe monitoring component, wherein the event determination component determines an occurrence of an event according to locations of avatars that are on-line in the virtual universe and fields of view that the avatars have from each of the locations, wherein the event determination component is further configured to apply an event weighting to each of the locations that have avatars and to locations of the virtual universe that are in the field of view of the avatars, wherein each event weighting applied to locations that have avatars congregated thereat and locations that are in the field of view of the avatars signifies a probability that an event is occurring at a particular location, specify a weight multiplier to a particular location within the virtual universe as a function of a number of avatars viewing the location, wherein the weight multiplier affects the event weighting according to the number of avatars viewing the particular location, the more number of avatars viewing the location has a higher weight multiplier that corresponds to a higher event weighting specified for that location, while the less number of avatars viewing the location has a lower weight multiplier that corresponds to a lower event weighting specified for that location, and modify the event weighting of a location in the virtual universe in response to a determination that the weighting is disproportionate to an average weighting that is historically associated with that location.

11. The system according to claim 10, further comprising an event declaration component configured to declare the occurrence of an event to the avatars.

12. The system according to claim 11, wherein the event declaration component is further configured to provide notification through a medium that includes at least one of an email message, an instant message, video or a bulletin board.

13. The system according to claim 11, wherein the event declaration component is further configured to provide notification through an invitation to teleport to the location of the event.

14. A computer-readable storage device storing computer instructions, which when executed, enables a computer system to automatically determine an occurrence of an event in a virtual universe, the computer instructions comprising:

monitoring a plurality of regions within the virtual universe; and determining an occurrence of an event within at least one of the plurality of regions according to locations of avatars that are on-line in the virtual universe and fields of view that the avatars have from each of the locations, wherein the determining of an occurrence of an event comprises applying an event weighting to the locations of the avatars that are on-line in the virtual universe and to locations of the virtual universe that are in the field of view of the avatars, wherein each event weighting applied to locations that have avatars congregated thereat and locations that are in the field of view of the avatars signifies a probability that an event is occurring at a particular location, specifying a weight multiplier to a particular location within the virtual universe as a function of a number of avatars viewing the location, wherein the weight multiplier affects the event weighting according to the number of avatars viewing the particular location, the more number of avatars viewing the location has a higher weight multiplier that corresponds to a higher event weighting specified for that location, while the less number of avatars viewing the location has a lower weight multiplier that corresponds to a lower event weighting specified for that location, and modifying the event weighting of a location in the virtual universe in response to a determination that the weighting is disproportionate to an average weighting that is historically associated with that location.

15. The computer-readable storage device according to claim 14, further comprising instructions for declaring the occurrence of an event to the avatars.

16. The computer-readable storage device according to claim 15, wherein the declaring of the occurrence of an event comprises instructions for notifying the avatars through a medium that includes at least one of an email message, instant message, or a bulletin board.

17. The computer-readable storage device according to claim 15, wherein the declaring of the occurrence of an event comprises instructions for notifying the avatars through an invitation to teleport to the location of the event.

18. The computer-readable storage device according to claim 15, wherein the declaring of the occurrence of an event comprises instructions for notifying users that have avatars in the virtual universe but are presently off-line during declaration of the event.

19. A method for deploying an event occurrence detection tool for use in a computer system that automatically determines an occurrence of an event in a virtual universe, comprising:

providing a computer infrastructure operable to:

monitor a plurality of regions within the virtual universe; and determine an occurrence of an event within at least one of the plurality of regions according to locations of avatars that are on-line in the virtual universe and fields of view that the avatars have from each of the locations, wherein the determining of an occurrence of an event comprises applying an event weighting to the locations of the avatars that are on-line in the virtual universe and to locations of the virtual universe that are in the field of view of the avatars, wherein each event weighting applied to locations that have avatars congregated thereat and locations that are in the field of view of the avatars signifies a probability that an event is occurring at a particular location, specifying a weight multiplier to a particular location within the virtual universe as a function of a number of avatars viewing the location, wherein the weight multiplier affects the event weighting according to the number of avatars viewing the particular location, the more number of avatars viewing the location has a higher weight multiplier that corresponds to a higher event weighting specified for that location, while the less number of avatars viewing the location has a lower weight multiplier that corresponds to a lower event weighting specified for that location, and modifying the event weighting of a location in the virtual universe in response to a determination that the weighting is disproportionate to an average weighting that is historically associated with that location.

* * * * *